United States Patent
Wang et al.

(10) Patent No.: US 10,556,617 B2
(45) Date of Patent: Feb. 11, 2020

(54) STEER-BY-WIRE AND INDEPENDENT-DRIVE INTEGRATED WHEEL-SIDE ELECTRIC DRIVE DEVICE

(71) Applicant: Jilin University, Changchun (CN)

(72) Inventors: Junnian Wang, Changchun (CN); Dedong Guo, Changchun (CN); Zheng Luo, Changchun (CN)

(*) Notice: Subject to any disclaimer, the term of this patent is extended or adjusted under 35 U.S.C. 154(b) by 150 days.

(21) Appl. No.: 15/954,730

(22) Filed: Apr. 17, 2018

(65) Prior Publication Data
US 2018/0297629 A1    Oct. 18, 2018

(30) Foreign Application Priority Data
Apr. 17, 2017    (CN) .......................... 2017 1 0247967

(51) Int. Cl.
| | | |
|---|---|---|
| *B62D 5/04* | (2006.01) | |
| *B62D 5/00* | (2006.01) | |
| *B60K 7/00* | (2006.01) | |
| *B62D 7/09* | (2006.01) | |

(52) U.S. Cl.
CPC ............ *B62D 5/046* (2013.01); *B60K 7/0007* (2013.01); *B62D 5/006* (2013.01); *B62D 5/0424* (2013.01); *B62D 5/0448* (2013.01); *B62D 7/09* (2013.01); *B60K 2007/0092* (2013.01); *Y02T 10/7275* (2013.01)

(58) Field of Classification Search
CPC ...... B62D 5/046; B62D 5/006; B62D 5/0424; B62D 5/0448; B62D 7/09; B60K 7/0007; B60K 2007/0092
See application file for complete search history.

(56) References Cited

U.S. PATENT DOCUMENTS

| | | | | | |
|---|---|---|---|---|---|
| 2004/0119373 | A1* | 6/2004 | Akatsu | ................... | H02K 1/276 310/266 |
| 2004/0155554 | A1* | 8/2004 | Morgante | ............... | H02K 16/02 310/266 |
| 2008/0277193 | A1* | 11/2008 | Yoshioka | ............. | B62D 5/0403 180/444 |
| 2008/0283331 | A1* | 11/2008 | Higashi | ............... | B62D 5/0403 180/444 |
| 2009/0224628 | A1* | 9/2009 | Hiwaki | ................... | H02K 5/08 310/216.113 |

* cited by examiner

*Primary Examiner* — Kevin Hurley
*Assistant Examiner* — Michael R Stabley
(74) *Attorney, Agent, or Firm* — Erson IP (Nelson IP)

(57) ABSTRACT

The present invention relates to a steer-by-wire and independent-drive integrated wheel-side electric drive device, including a first double-rotor motor and a second double-rotor motor, fixedly arranged coaxially along an axial direction of a motor, an inner rotor of the first double-rotor motor is connected with a first drive shaft and is used for driving a wheel on one side to rotate; an inner rotor of the second double-rotor motor is connected with a second drive shaft and is used for driving a wheel on the other side to rotate; an outer rotor of the first double-rotor motor and an outer rotor of the second double-rotor motor are respectively connected with a driving gear by virtue of an output shaft.

8 Claims, 12 Drawing Sheets

STEER-BY-WIRE AND INDEPENDENT-DRIVE INTEGRATED WHEEL-SIDE ELECTRIC DRIVE DEVICE

CROSS-REFERENCE TO RELATED APPLICATIONS

This application claims priority to Chinese Patent Application No. 201710247967.3 with a filing date of Apr. 17, 2017, designating the United States, now pending. The content of the aforementioned applications, including any intervening amendments thereto, are incorporated herein by reference.

TECHNICAL FIELD

The present invention relates to the technical field of automobiles, and particularly relates to a steer-by-wire and independent-drive integrated wheel-side electric drive device.

BACKGROUND OF THE PRESENT INVENTION

Performance of a steering system of an automobile greatly influences safety, operating stability and driving pleasure of the automobile. The steering system of the automobile from an initial mechanical steering system to now has increasingly excellent performance. A hydraulic power steering system solves a problem that the mechanical steering system needs great effort in operation; and an electric power steering system solves problems that power control characteristics of the hydraulic power steering system cannot be regulated, low-temperature power control performance is poor, hydraulic oil easily generates pollution and the like. However, the electric power steering system still cannot regulate a transmission ratio of the steering system, i.e., cannot fundamentally solve a contradiction between "light weight" and "flexibility" of the steering system.

However, an automotive steer-by-wire technology fundamentally solves such a contradiction. Since a steering wheel and a steering vehicle wheel are decoupled in an automotive steer-by-wire system, i.e., mechanical connection between the steering wheel and the steering vehicle wheel is canceled, the transmission ratio of the steering system may be regulated according to different automobile operating states, such as a vehicle speed and the like, by utilizing an electronic control method. On one hand, a contradiction between steering force and steering response time may be improved, thereby effectively increasing steering flexibility at low speed and operating stability at high speed. In addition, an intelligent steer-by-wire control system may make corresponding optimization to the operation of a driver, so as to further increase the driving pleasure. Meanwhile, since mechanical connection such as a steering column and the like is removed, injury to the driver by the steering column in collision accidents is effectively avoided. Moreover, the steer-by-wire system is connected with an automobile bus through a controller, so that favorable conditions are provided for development of an automotive drive-by-wire chassis and an automobile integration control technology in future.

SUMMARY OF PRESENT INVENTION

A purpose of the present invention is to provide a steer-by-wire and independent-drive integrated wheel-side electric drive device. A driving and steering integrated controller controls two double-rotor motors to output a driving torque and/or a steering torque, thereby realizing integration of a steering system and a driving system of an automobile.

Another purpose of the present invention is to provide a steer-by-wire and independent-drive integrated wheel-side electric drive device. A driving and steering integrated controller controls inner rotors of two double-rotor motors to output different driving torques, thereby realizing differential assisted steering.

In order to achieve these purposes and other advantages of the present invention, a steer-by-wire and independent-drive integrated wheel-side electric drive device is provided, including:

a first double-rotor motor and a second double-rotor motor, fixedly arranged coaxially along an axial direction of the motors, wherein an inner rotor of the first double-rotor motor is connected with a first drive shaft and is used for driving a wheel on one side to rotate;

an inner rotor of the second double-rotor motor is connected with a second drive shaft and is used for driving a wheel on the other side to rotate;

an outer rotor of the first double-rotor motor and an outer rotor of the second double-rotor motor are connected with a driving gear by virtue of an output shaft or respectively by virtue of an output shaft, so as to drive the driving gear to rotate;

a steering gear lead screw, of which both ends are respectively hinged with a tie rod; and a driven gear, of which a center hole is matched with the steering gear lead screw by virtue of a ball screw nut pair. The steering gear lead screw may be driven to axially move under the driving of the driving gear, thereby realizing steering.

Preferably, the present invention further includes a road feel simulation mechanism including:

a steering wheel, of which a center is connected with a steering shaft through spline;

a sensor module, mounted on the steering shaft and used for detecting a torque and a steering angle of the steering wheel; and a road feel simulation motor, of which a motor output shaft is connected with the steering shaft by virtue of a worm gear and worm reducing mechanism, wherein the road feel simulation motor outputs a road feel simulation torque.

Preferably, each of the first double-rotor motor and the second double-rotor motor includes:

a shell having an accommodating space therein, used for arranging an outer rotor and an inner rotor;

permanent magnets, embedded on inside and outside surfaces of the outer rotor;

a stator fixed on an inner surface of the shell;

a stator excitation winding, fixed on the stator and, carrying current to generate a magnetic field;

an armature winding, mounted on the inner rotor;

an outer rotor output shaft, wherein one end is connected with the outer rotor and the other end is connected with the driving gear, for outputting a steering torque for driving a wheel to steer; and an inner rotor output shaft, wherein one end is connected with the inner rotor and the other end is connected with a first drive shaft or a second drive shaft, for outputting a driving torque for driving a vehicle to run.

Preferably, the outer rotor includes a main body and an end cover matched with each other in a castellated manner. The inner rotor is nested in an accommodating space formed by the main body and the end cover through the support of a front bearing and a rear bearing, and an output end of the inner rotor penetrates out of the accommodating space and is connected with an inner rotor output shaft.

Preferably, the present invention further includes:

an idler shaft, respectively meshed with the driving gear and the driven gear, and used for transmitting power from the driving gear to the driven gear;

a gear box body, of which an interior is hollow, for accommodating the driving gear, the idler shaft and the driven gear; and a gear box cover, connected with the gear box body by bolts, and used for covering an opening of the gear box body.

Preferably, the present invention further includes:

a steering gear sleeve, of which an interior is hollow, for accommodating a steering gear lead screw, wherein upper ring grooves for accommodating thrust bearings are formed in both ends of the driven gear, lower ring grooves are correspondingly formed in the steering gear sleeve, and the driven gear is supported on the steering gear sleeve by virtue of the thrust bearings, wherein a first spiral raceway and an inner circulation raceway are formed in inner hole walls of the driven gear, and a second spiral raceway which is in clearance fit with the first spiral raceway is formed in the steering gear lead screw; and a ball, rolling along the first spiral raceway, the second spiral raceway and the inner circulation raceway, and used for alleviating friction force.

Preferably, one end of each of the first drive shaft and the second drive shaft is connected with the inner rotor output shaft by virtue of an inner universal joint, for inputting drive power; and one end of an outer half-axle is respectively connected with the other end of each of the first drive shaft and the second drive shaft by virtue of an outer universal joint.

A steering knuckle is supported on a hub and a wheel by virtue of a hub bearing, and a hollow journal is arranged on the steering knuckle.

The other end of the outer half-axle penetrates through the hollow journal and is connected with the hub by virtue of a rim bolt, for driving the wheel to rotate.

The steering knuckle is connected with a tie rod by virtue of a steering knuckle arm ball stud, and is used for driving the wheel to steer.

Preferably, the present invention further includes:

a driving and steering integrated controller connected with a controller of the first double-rotor motor and the second double-rotor motor by virtue of a CAN bus, wherein the controller of the double-rotor motors receives an instruction of the driving and steering integrated controller and controls the inner rotors to output driving torques and controls the outer rotors to output steering torques;

The inner rotors of the first double-rotor motor and the second double-rotor motor output different driving torques, and a difference of the driving torques cooperatively drives the wheel to steer.

The present invention at least includes the following beneficial effects: 1, driving force for automobile running and driving force of a steering actuator may be simultaneously provided by utilizing a structure characteristic that the double-rotor motors have two output ends; the integrated design of the steering system and the driving system of the automobile is realized; and the present invention is compact in spatial arrangement and high in integration degree and is an effective technical solution for integration and electronization of the automotive chassis in future; 2, the mechanical connection such as the steering column and the like in the steering system is removed, thereby decreasing the injury to the driver during occurrence of the automotive collision accidents; 3, the steering actuator is driven by the two double-rotor motors together, and when one double-rotor motor fails, the automobile may still maintain steering capability by adjusting the output torque of the other double-rotor motor, i.e., reliability of the system is improved by adopting a hardware redundancy method; 4, the two double-rotor motors are respectively controlled by the driving-steering integrated controller, so that driving torques of wheels on both sides may be reasonably distributed during steering, and effects of cooperative steering and energy saving of steering are achieved; and 5, the two double-rotor motors and the steering actuator are arranged on a frame to drive the wheels by virtue of the half-axle through the integrated design, so unsprung mass is not increased, and running smoothness is excellent.

Other advantages, purposes and features of the present invention will be partially reflected by description below, and the rest part may be understood by those skilled in the art by virtue of research and practice of the present invention.

DETAILED DESCRIPTION OF PREFERRED EMBODIMENTS

The present invention is further described in detail below in combination with drawings, to enable those skilled in the art to implement the present invention by referring to words in description.

It should be understood that, terms such as "has", "include" and "comprise" used in the present invention do not exclude existence or addition of one or more other elements or a combination thereof.

FIGS. 1-12 illustrate an implementation form of the present invention. A steer-by-wire and independent-drive integrated wheel-side electric drive device in the present invention includes a road feel simulation mechanism, a steering actuator, a power unit, a wheel-side driving system, a driving-steering integrated controller (ECU) and CAN buses, wherein the ECU is connected with a steering wheel torque and angle sensor by virtue of a simulated signal line, and connected with other vehicle-mounted sensors, two double-rotor motors and a road feel simulation motor controller by virtue of the CAN buses, thereby realizing driving and steering control of a vehicle.

The road feel simulation mechanism includes a steering wheel 100, a sensor module 200 and a road feel simulation motor 300; the steering actuator includes a steering gear 400 and a gear box 600; the power unit includes two double-rotor motors 500; and the wheel-side driving system includes two running mechanisms 700. The ECU is connected with the CAN buses to read a vehicle speed signal, a lateral acceleration, yaw velocity and other signals of the CAN buses, and transmits control instructions to the road feel simulation motor and the two double-rotor motors by virtue of the CAN buses, thereby controlling operations of the road feel simulation mechanism, the steering actuator and the power unit. The road feel simulation mechanism provides road feel feedback for a driver during steering; the ECU controls inner rotor output shafts of the double-rotor motors 500 on left and right sides to respectively output driving torques to enable an automobile to run by virtue of the two running mechanisms 700. The ECU controls outer rotor output shafts of the double-rotor motors 500 on the left and right sides to output torques, and drives the steering gear 400 by virtue of the gear box 600 to drag the running mechanisms 700 to steer.

Figure 1:
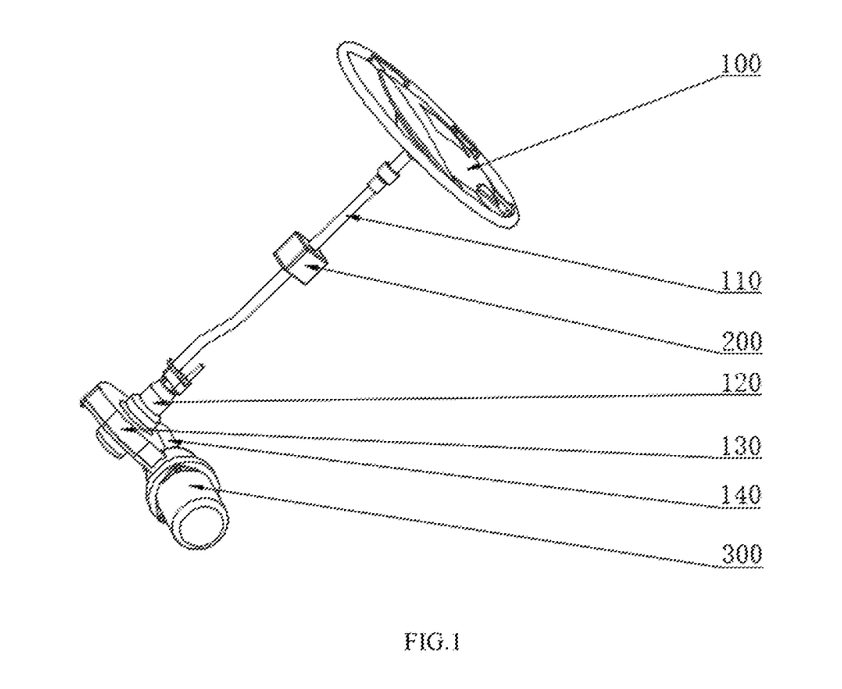
FIG. 1 is a three-dimensional view of a road feel simulation mechanism of a steer-by-wire and independent-drive integrated wheel-side electric drive device in the present invention.
Figure 2:
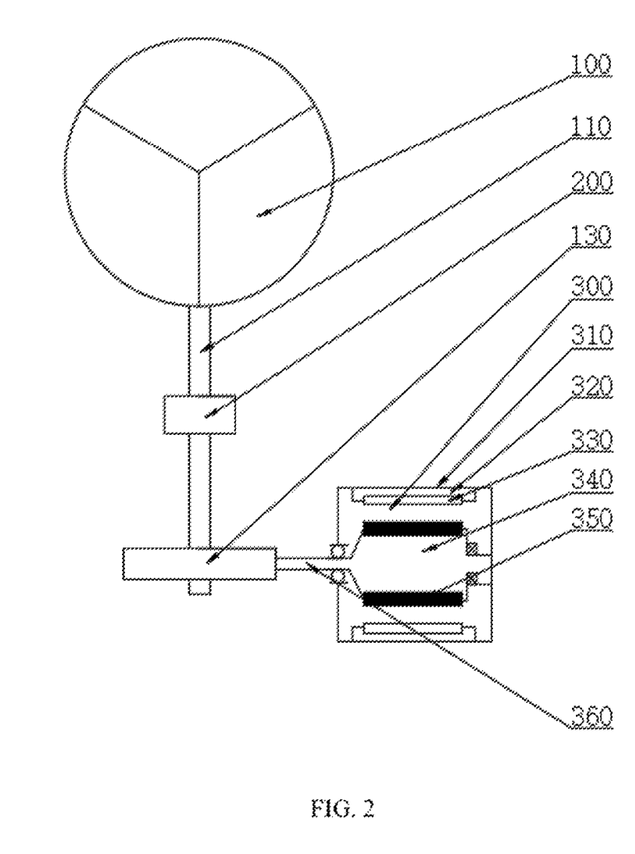
FIG. 2 is a structural schematic diagram of a road feel simulation mechanism of a steer-by-wire and independent-drive integrated wheel-side electric drive device in the present invention.

As shown in FIGS. 1 and 2, the road feel simulation mechanism in the present invention includes the steering wheel 100, the sensor module 200 and the road feel simulation motor 300. The road feel simulation mechanism further includes a steering shaft 110 and a worm gear and worm reducing mechanism. The worm gear and worm reducing mechanism includes a worm gear shaft 120, a worm gear 130 and a worm 140. The steering wheel 100 is selected from a three-amplitude type or four-amplitude type steering wheel according to needs; a center of the steering wheel 100 is connected with the upper end of the steering shaft 110 by virtue of a spline; and the upper end of the steering shaft 110 is connected with the steering wheel 100 and synchronously rotates along with the steering wheel 100. The lower end of the steering shaft 110 is connected with the worm gear shaft 120 by virtue of a safety pin; an external spline is arranged on the worm gear shaft 120; an internal splined hole corresponding to the worm gear 130 is formed in the worm gear 130; the worm gear shaft 120 is connected with the worm gear 130 by virtue of a spline; the worm gear 130 is engaged with the worm 140; and the worm 140 is connected with an output shaft 360 of the road feel simulation motor 300 by virtue of a coupling. A torque outputted by the road feel simulation motor 300 is increased by virtue of speed reduction of the worm gear and worm reducing mechanism and then is transferred to the steering wheel 100 by virtue of the steering shaft 110 so as to serve as a steering load, so that the driver gets a simulated steering road feel.

Figure 11:
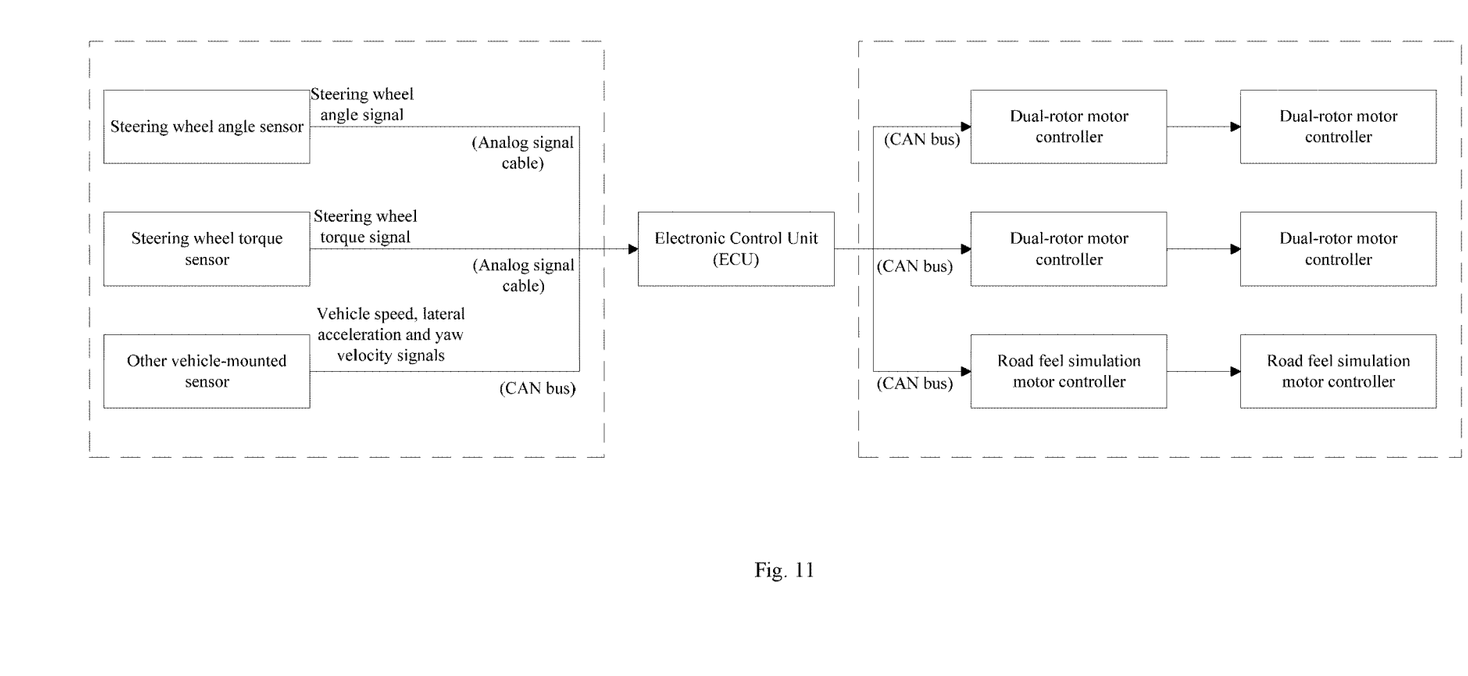
FIG. 11 is an electrical connection relationship diagram of a steer-by-wire and independent-drive integrated wheel-side electric drive device in the present invention.

As shown in FIGS. 1, 2 and 11, the sensor module 200 includes a torque sensor 210 and an angle sensor 220. The torque sensor 210 and the angle sensor 220 are integrated into the sensor module 200 and fixedly connected to the steering shaft 110 in series. The torque sensor 210 plays the actions of measuring the torque of the steering wheel in real time and transmitting the torque to the ECU, and the angle sensor 220 plays the actions of measuring an angle of the steering wheel in real time and transmitting the angle to the ECU.

As shown in FIG. 2, in another embodiment, the road feel simulation motor 300 includes a shell 310, a stator 320, a stator excitation winding 330, a rotor 340, an armature winding 350 and a motor output shaft 360, wherein the shell 310 is used for accommodating the rotor 340; the stator 320 is fixed to the shell 310; the stator excitation winding 330 is mounted on the stator 320; the armature winding 350 is mounted on the rotor 340; and the motor output shaft 360 is supported on the shell 310 by a bearing, and one end of the motor output shaft 360 extends out of the shell and is connected with the worm gear and worm reducing mechanism. In this way, the torque outputted by the road feel simulation motor is transmitted onto the steering wheel 100.

Figure 4:
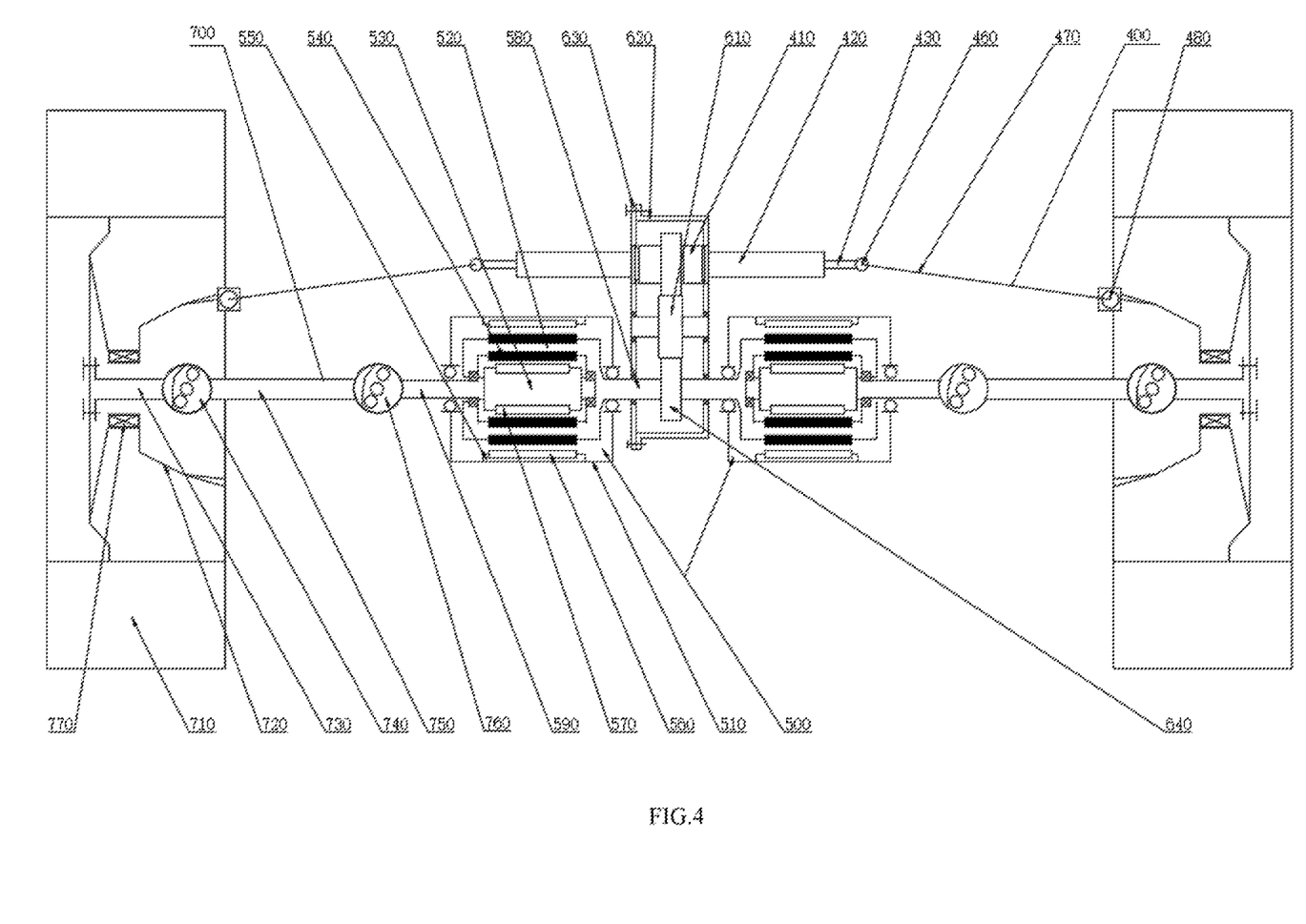
FIG. 4 is a structural schematic diagram of integrated assembly of a steering actuator and a driving mechanism of a steer-by-wire and independent-drive integrated wheel-side electric drive device in the present invention.

As shown in FIG. 4, each of the double-rotor motors 500 includes a shell 510, an outer rotor 520, an inner rotor 530, permanent magnets 540, a stator 550, a stator excitation winding 560, an armature winding 570, a motor outer rotor output shaft 580 and an inner rotor output shaft 590, wherein the shell 510 is used for accommodating the outer rotor 520 and the inner rotor 530; the permanent magnets 540 are embedded on inside and outside surfaces of the outer rotor 520; the stator 550 is fixed to the shell 510; the stator excitation winding 560 is mounted on the stator 550; and the armature winding 570 is mounted on the inner rotor 530, wherein the motor outer rotor output shaft 580 and the outer rotor 520 are connected with an input end on a left side of the gear box 600 of the steering actuator, so that the gear box 600 drives the steering gear 400 to drag the running mechanisms 700 to steer. The motor inner rotor output shaft 590 and the inner rotor 530 are connected with an inner universal joint by virtue of splines. The inner rotor output shaft 590 of each of the double-rotor motors 500 is connected with inner and outer half axles to drive wheels to rotate on the left side by virtue of universal joints, thereby driving the vehicle to run.

The steering actuator includes a steering gear 400 and a gear box 600. The gear box 600 is coupled to outer rotors 520 of the double-rotor motors on the both sides to output torques and achieve the effects of reducing the speed and increasing the torques, and the steering gear 400 is connected with the gear box 600 and changes rotary motion into linear motion by virtue of a ball screw nut pair, thereby achieving the effect of motion transformation.

Figure 3:
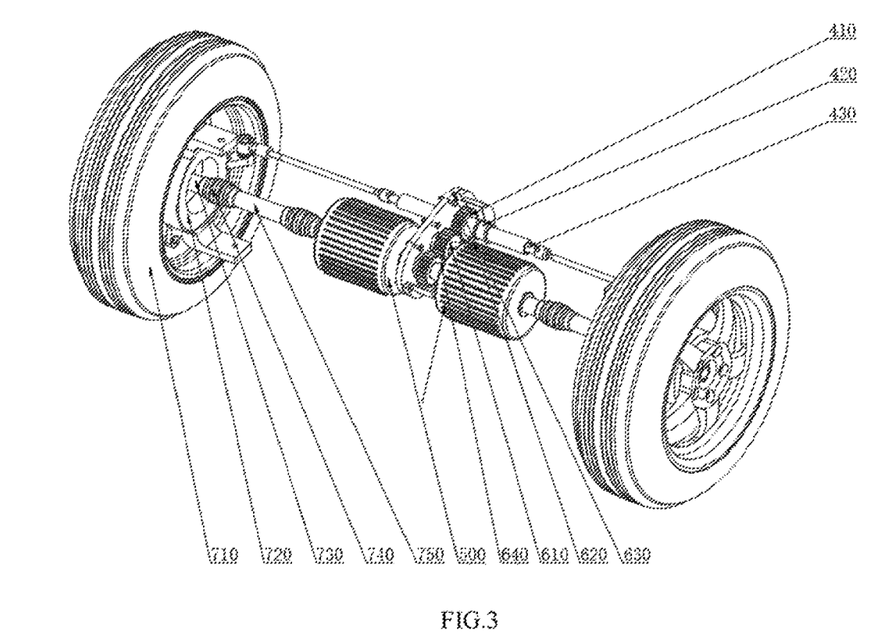
FIG. 3 is a three-dimensional view of integrated assembly of a steering actuator and a driving mechanism of a steer-by-wire and independent-drive integrated wheel-side electric drive device in the present invention.
Figure 5:
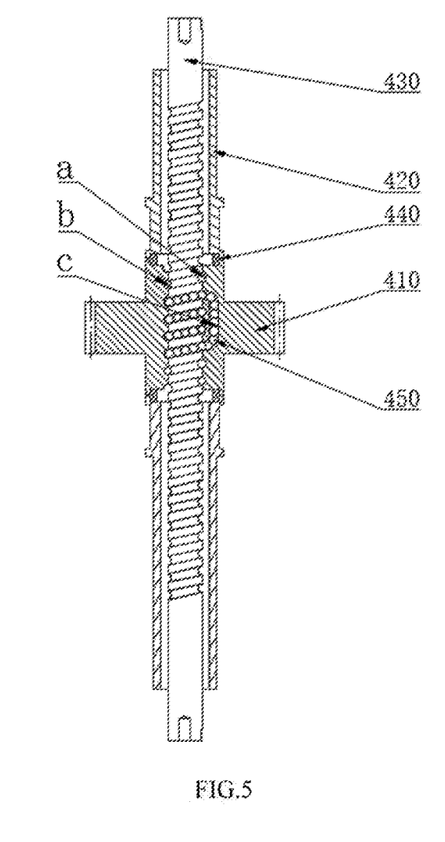
FIG. 5 is a full section view of a steering gear of a steer-by-wire and independent-drive integrated wheel-side electric drive device in the present invention.
Figure 6:
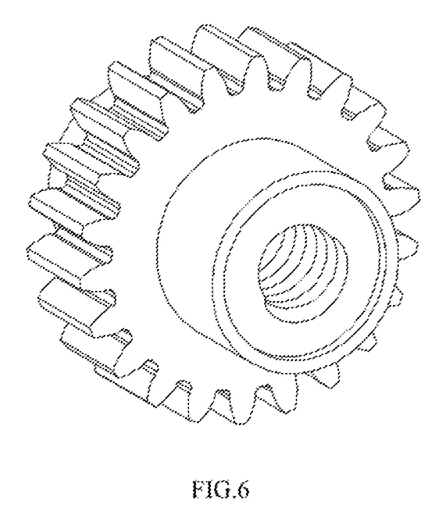
FIG. 6 is an axonometric drawing of a driven gear of a gear box of a steer-by-wire and independent-drive integrated wheel-side electric drive device in the present invention.
Figure 7:
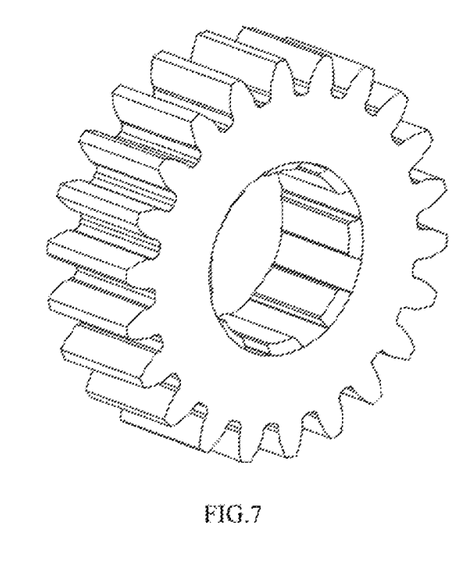
FIG. 7 is an axonometric drawing of a driving gear of a gear box of a steer-by-wire and independent-drive integrated wheel-side electric drive device in the present invention.
Figure 8:
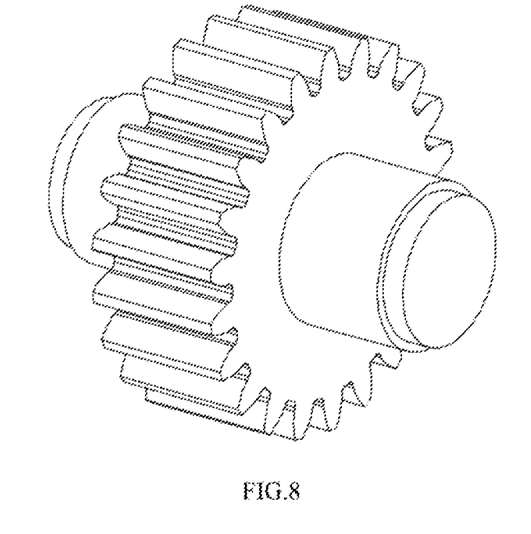
FIG. 8 is an axonometric drawing of an idler shaft of a gear box of a steer-by-wire and independent-drive integrated wheel-side electric drive device in the present invention.

As shown in FIGS. 3-5, the steering gear 400 includes a driven gear 410, a steering gear sleeve 420, a steering gear lead screw 430, thrust bearings 440, balls 450, tie rod ball studs 460, tie rods 470 and steering knuckle arm ball studs 480. The driven gear 410 has an output driven gear of the gear box 600 and a rotating nut of the steering gear 400; ring grooves used for mounting the thrust bearings 440 are formed in both end surfaces of the driven gear 410 and the steering gear sleeve 420; the driven gear 410 is supported on the steering gear sleeve 420 by two thrust bearings 440; and the steering gear sleeve 420 penetrates out of both ends of the gear box 600 an is fixed to the gear box 600 in an interference fit manner. The driven gear 410 and the steering gear lead screw 430 form a ball screw nut pair; and an arc spiral raceway a is formed in an inner hole wall of the driven gear 410 and is in clearance fit with an arc spiral raceway b in an outer cylindrical surface of the steering gear lead screw 430 so as to form a raceway of the ball, and the balls 450 are mounted in the raceways. An inner circulation raceway c is formed in the driven gear 410 and can enable the balls to circularly roll; the driven gear 410 and the steering gear lead screw 430 are matched to form the ball screw nut pair; and the rotary motion of the driven gear 410 is changed into left-right motion of the steering gear lead screw 430. As shown in FIG. 5, threaded holes are formed in both ends of the steering gear lead screw 430 and are used for mounting the tie rod ball studs 460 so as to be connected with the steering tie rods 470 on both sides by utilizing spherical hinges. The driven gear 410 is engaged and driven by a driving gear 640 by virtue of an idler shaft 610 and drives the steering gear lead screw 430 to move from left to right, thereby dragging the wheels 710 by virtue of the left and right tie rods 470 and the steering knuckle arm ball studs 480 so as to enable the automobile to steer. The steering gear 400 achieves the effect of motion transformation, and the rotary motion is changed into the linear motion by virtue of the ball screw nut pair.

The gear box 600 includes the idler shaft 610, a gear box body 620, a gear box cover 630 and the driving gear 640. In embodiments shown in FIGS. 3, 4, 6-8 and 12, the gear box 600 is fixed to a frame, and the gear box body 620 is connected with the gear box cover 630 by a bolt and is used for accommodating the driving gear 640, the idler shaft 610 and the driven gear 410. Two through holes are formed in upper ends of the gear box body 620 and the gear box cover 630 and are in interference fit with the outer wall of the steering gear sleeve 420 for fixing the steering gear sleeve 420; two counter bores are formed between the gear box body 620 and the gear box cover 630 and are used for mounting a supporting bearing of the idler shaft 610; two through holes are formed in lower ends of the gear box body 620 and the gear box cover 630, so that outer rotor output shafts 580 of the double-rotor motors 500 on the left and right sides penetrate through the through holes and are supported by bearings arranged in the through holes. A splined hole is formed in the center of the driving gear 640, and the driving gear 640 is connected with the outer rotor output shafts 580 of the double-rotor motors by virtue of splines. In order to couple the outer rotor output shafts of the double-rotor motors on both sides together by virtue of the driving gear, an external spline length of the outer rotor output shafts 580 of the double-rotor motors 500 is 0.5-1 mm shorter than one half of the tooth thickness of the driving gear 640. The connection manner of the outer rotor output shaft of the double-rotor motor on the right side and the driving gear is the same as the previous manner. The idler shaft 610 is simultaneously engaged with the driving gear 640 and the driven gear respectively, and the driving gear 640 transfers the power to the driven gear 410 by virtue of the engaging drive of the idler shaft 610.

Figure 12:
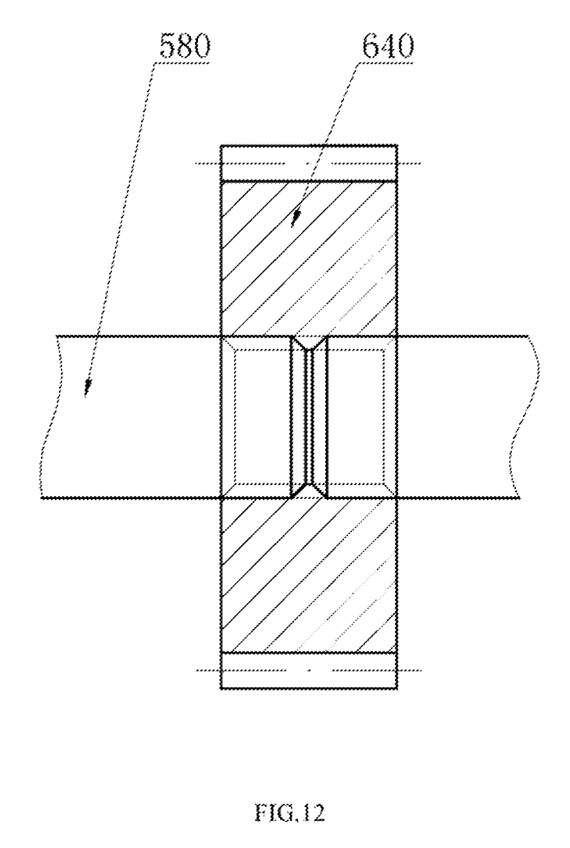
FIG. 12 is a connection relationship diagram of a driving gear and outer rotor output shafts of two double-rotor motors in a steer-by-wire and independent-drive integrated wheel-side electric drive device of the present invention.

As shown in FIGS. 3, 4 and 12, the gear box 600 and the steering gear 400 are connected together by the driven gear 410. The driven gear 410 has the output driven gear of the gear box 600 and the rotating nut of the steering gear 400, and forms a ball screw nut pair with the steering gear lead screw 430. Both ends of the steering gear 400 are hinged with two left and right tie rods 470 by virtue of the two left and right tie rod ball studs 460, and the two left and right tie rods 470 are hinged with knuckles 720 of the left and right wheels by virtue of two left and right steering knuckle arm ball studs 480. The outer rotor output shafts 580 of the double-rotor motors 500 are connected with the driving gear 640 of the gear box 600 by virtue of splines; and the external spline length of the outer rotor output shafts 580 of the double-rotor motors 500 is 0.5-1 mm shorter than one half of the tooth thickness of the driving gear 640. The connection manner of the outer rotor output shaft of the double-rotor motor on the right side and the driving gear is the same as the previous manner. The two double-rotor motors 500 synchronously rotate under the control of the ECU to drive the driving gear, and the automobile steering mechanism further drives the automobile to steer.

The wheel-side driving system includes two running mechanisms 700. Each of the running mechanisms 700 includes a wheel 710, a knuckle 720, an outer half axle 730, an outer universal joint 740, an inner half axle 750, an inner universal joint 760 and a hub bearing 770. Horizontal motion of the steering gear lead screw 430 is transformed into rotation of the knuckle 720 by virtue of the left and right tie rods, so as to enable the wheel to steer. A journal of the knuckle 720 is supported on the hub and the wheel 710 by the hub bearing 770. The journal of the knuckle 720 is hollow, and the outer half axle 730 may penetrate through the journal. As shown in FIGS. 3 and 4, the inner rotor output shafts 590 of the double-rotor motors 500 are connected with the inner half axles 750 by virtue of the inner universal joints 760; the inner half axles 750 are connected with the outer half axles 730 by virtue of the outer universal joints 740; and the outer half axles 730 penetrate through journal inner holes of the knuckles 720 and are connected with the hub and the wheels 710 by virtue of rim bolts so as to transfer the driving torques of the double-rotor motors. The driving manner of the wheels on the right side of the automobile is identical to that of the wheels on the left side, so unnecessary details are avoided. The double-rotor motors on the left and right sides, the universal joints and the half axles form a wheel-side independent-drive system in the present invention, so that independent drive of the wheels on the left and right sides may be realized. Moreover, a differential steering torque may be produced by utilizing a difference of driving force of the left and right wheels to assist the steer-by-wire apparatus to complete a steering action, thereby realizing energy saving of steering.

Figure 9:
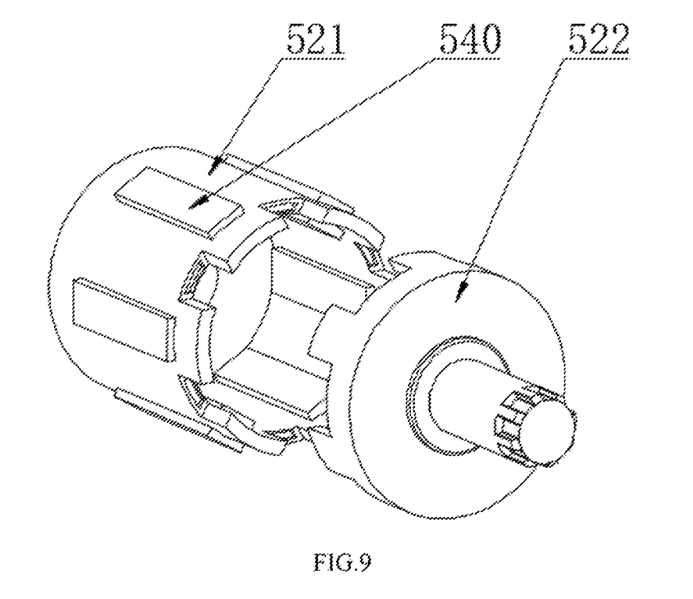
FIG. 9 is a three-dimensional view of an outer rotor of a double-rotor motor of a steer-by-wire and independent-drive integrated wheel-side electric drive device in the present invention.

In another embodiment, as shown in FIG. 9, the outer rotors 520 include main bodies 521 and end covers 522 matched with each other in a castellated manner. The permanent magnets 540 are uniformly embedded on inside and outside surfaces of the main bodies 521. The front end of the main bodies 521 is provided with a stepped through hole composed of a bearing hole with a larger inner diameter and an unthreaded hole with a smaller inner diameter, wherein the bearing hole is used for mounting a front supporting bearing of the inner rotors 530. A bearing counter bore is formed in the inner side of the bottom of the end covers 522 and is used for mounting a rear supporting bearing of the inner rotors 530. Meanwhile, external splines are machined at output shaft ends of the end covers 522 for connecting with the driving gear 640 of the gear box 600 in the steering actuator through the splines. As shown in FIG.

Figure 10:
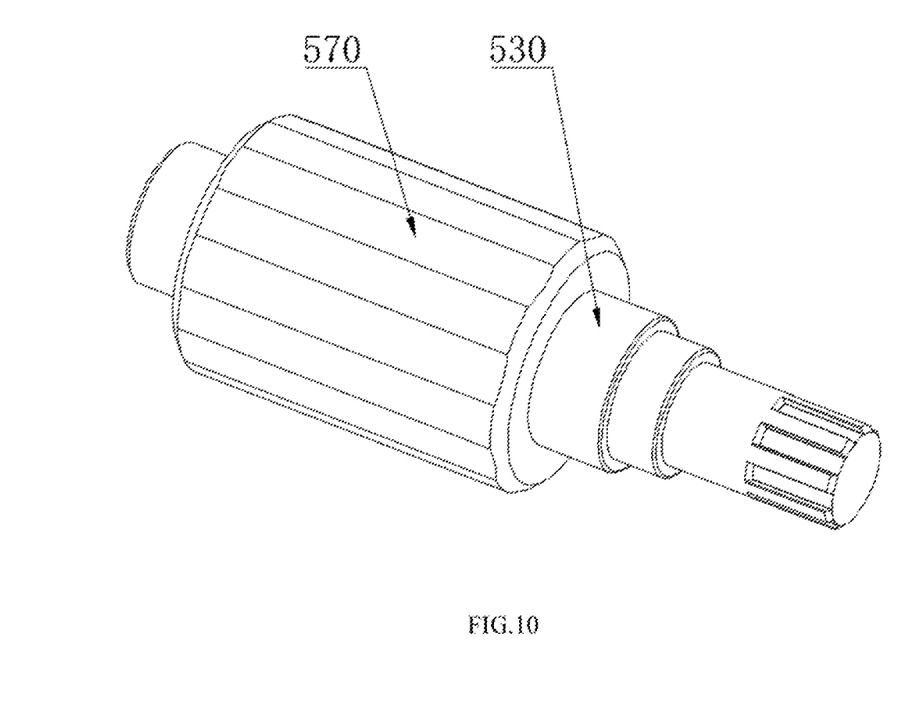
FIG. 10 is a three-dimensional view of an inner rotor of a double-rotor motor of a steer-by-wire and independent-drive integrated wheel-side electric drive device in the present invention.

10, double-rotor motor armature windings 570 are wound in middles of the inner rotors 530 of the double-rotor motors 500. Three-level stepped shafts are arranged at front ends (right ends) of the inner rotors 530, i.e., an optical axis for mounting the front supporting bearing between the inner and outer rotors, an optical axis for mounting the front supporting bearing between the inner rotors and double-rotor motor shells, and a spline shaft machined with a section of spline at an axle end from side to outside sequentially. A section of optical axis is arranged at a rear end (left end) of each of the inner rotors 530 for arranging the rear supporting bearing between the inner and outer rotors. The inner rotors 530 are embedded into an accommodating space formed by the main bodies 521 and the end covers 522 matched with each other in the castellated manner by virtue of the front and rear supporting bearings. During mounting, the front ends (the right ends) of the inner rotors 530 and the front supporting bearings are firstly mounted into the through holes inside the main bodies 521 of the outer rotors 520; then the rear supporting bearings are mounted into the counter bores of the end covers 522 of the outer rotors; the end covers 522 and the main bodies 521 of the outer rotors are matched and opposed by virtue of rectangular teeth which are in circumferential distribution at the ends; and the outer rotors 520 and the inner rotors 530 are wholly mounted into the shells 510 of the double-rotor motors together. The structure of the double-rotor motor on the right side is identical with that mounted on the left side, so unnecessary details are avoided.

In another embodiment, as shown in FIG. 9, six arc trapezoidal groove teeth are formed in matched positions of the rear ends of the main bodies 521 of the outer rotors and the end covers 522; width dimensions of the groove teeth at radial ends near the circle center are smaller than those at distant ends away from the circle center; and circular arc small grooves are formed in tooth root planes of the groove teeth. Six arc trapezoidal convex teeth are formed in corresponding positions of the six arc trapezoidal grooves of the end covers 522 and the main bodies 521; width dimensions of the convex teeth at radial ends near the circle center are smaller than those at distant ends away from the circle center; circular arc bulges corresponding to small grooves at tooth roots of the arc trapezoidal groove teeth roots in the main bodies are formed in tooth crest planes of the arc trapezoidal convex teeth; and the arc trapezoidal bulges and the arc trapezoidal grooves have the same fundamental dimensions. When the main bodies 521 and the end covers 522 are combined into the outer rotors 520, the arc trapezoidal groove teeth of the main bodies 521 and the corresponding arc trapezoidal convex teeth of the end covers are matched and positioned in both toothed sides to achieve a radial positioning effect; and every two of the small grooves at the respective tooth roots and tooth crest circular arc bulges are in corresponding clearance fit to achieve auxiliary radial limiting and axial positioning effects, thereby ensuring that the main bodies 521 and the end covers 522 are reliably centered when matched in the castellated manner.

According to the driving-steering integrated controller (ECU), as shown in FIG. 11, signals outputted by the torque sensor 210 and the angle sensor 220 are transmitted to the ECU by virtue of simulated signal cables. The ECU reads a torque signal and an angle signal measured by the torque sensor 210 and the angle sensor 220 in the steering wheel in the sensor module 200, and controls torque output of the road feel simulation motor 300 and the two double-rotor motors according to other vehicle running state signals read by the CAN buses, such as a vehicle speed, a lateral acceleration signal, yaw velocity and other signals, thereby realizing driving and steering of the automobile. In addition, differences of the output torques of the inner rotors 530 of the two double-rotor motors are reasonably controlled to produce a difference of ground driving force of the left and right steering wheels, so that the effect of cooperative steering can be achieved by utilizing the differential torque, and the need for the output torques of the outer rotors of the double-rotor motors for automobile steering is reduced, thereby achieving the effect of energy saving of steering.

A mounting relationship of the steer-by-wire and independent-drive integrated wheel-side electric drive device in the present invention is as follows: the center of the steering wheel 100 is connected with the upper end of the steering shaft 110 through the spline, and the sensor 200 is mounted on the steering shaft 110. The lower end of the steering shaft 110 and the worm gear shaft 120 of the worm gear and worm reducing mechanism are connected through a safety pin to ensure passive safety during automobile collision. The external spline is formed in the worm gear shaft 120; the internal splined hole corresponding to the worm gear 130 is formed in the worm gear 130; the worm gear shaft 120 is connected with the worm gear 130 by virtue of the spline; and the worm 140 is connected with the output shaft 360 of the road feel simulation motor 300 by virtue of the coupling. The steering wheel 100 and the steering shaft 110 are supported on an automobile body to rotate; and the worm gear and worm reducing mechanism and the shell of the road feel simulation motor 300 are fixed to the automobile body. In this way, the torque outputted by the road feel simulation motor 300 may be transferred to the steering wheel to simulate the steering road feel. The double-rotor motors 500 on the steering actuator are fixed to the frame; the inner rotor output shafts 590 of the double-rotor motors connected with the inner rotors 530 are connected with the inner half axles 750 by virtue of the inner universal joints 760; the inner half axles 750 are connected with the outer half axles 730 by virtue of the outer universal joints 740; and the outer half axles 730 are connected with the hub and the wheels by virtue of the rim bolts. The right ends of the outer rotor output shafts 580 of the double-rotor motors connected with the outer rotors 520 are connected with the driving gear 640 by virtue of the splines; and the external spline length of the outer rotor output shafts 580 of the double-rotor motors is 0.5-1 mm shorter than one half of the tooth thickness of the driving gear 640. The connection manner of the outer rotor output shaft of the double-rotor motor on the right side and the driving gear 640 is the same as the previous manner. Both sides of the driving gear 640 are positioned by virtue of shaft shoulders of cut-off surfaces of splines on the two outer rotor output shafts of the double-rotor motors. The steering gear sleeve 420 is fixed to the gear box 600, and the ring grooves for mounting the thrust bearings 440 are formed in a section matched with the driven gear 410. The gear box 600 is fixed to the frame; the gear box body 620 and the gear box cover 630 are connected by virtue of the bolt; two unthreaded holes are formed in the upper ends of the gear box body 620 and the gear box cover 630 and are in interference fit with the steering gear sleeve 420; the idler shaft 610 is supported on the counter bores in wall surfaces of the gear box body 620 and the gear box cover 630 by virtue of the bearings and simultaneously engaged with the driving gear 640 and the driven gear 410 respectively; both ends of the steering gear lead screw 430 are connected with the tie rods 470 by virtue of the tie rod ball studs 460; and the tie rods 470 are connected with the knuckles 720 by virtue of the steering knuckle arm ball studs 480. The sensor module 200 is connected with the ECU by virtue of the simulated signal line, and the ECU is connected with respective controllers of the two double-rotor motors 500 and the road feel simulation motor 300 by virtue of the CAN buses. The ECU may read the torque signal and the angle signal of the steering wheel in the sensor module 200 and is connected with the complete CAN buses so as to read the vehicle speed signal, the lateral acceleration, the yaw velocity and the other signals of the CAN buses. The ECU controls the actions of the two double-rotor motors and the road feel simulation motor 300.

Although the embodiments of the present invention are disclosed above, the present invention is not only limited to the application in the description and the embodiments. The present invention may be applicable to various fields suitable for the present invention. Those skilled in the art may easily realize additional amendments. Therefore, the present invention is not limited to specific details and illustrated and described drawings herein on premise of not deviating from general concepts limited by claims and an equivalent scope.

We claim:

1. A steer-by-wire and independent-drive integrated wheel-side electric drive device, comprising:
    a first double-rotor motor and a second double-rotor motor, fixedly arranged coaxially along an axial direction of the motors, wherein
    an inner rotor of the first double-rotor motor is connected with a first drive shaft and is used for driving a wheel on one side to rotate;
    an inner rotor of the second double-rotor motor is connected with a second drive shaft and is used for driving a wheel on the other side to rotate;
    an outer rotor of the first double-rotor motor and an outer rotor of the second double-rotor motor are connected with a driving gear by virtue of an output shaft or respectively by virtue of an output shaft, so as to drive the driving gear to rotate;
    a steering gear lead screw, of which both ends are respectively hinged with a tie rod; and
    a driven gear, of which a center hole is matched with the steering gear lead screw by virtue of a ball screw nut pair, wherein the steering gear lead screw may be driven to axially move under the driving of the driving gear, thereby realizing steering.

2. The steer-by-wire and independent-drive integrated wheel-side electric drive device according to claim 1, wherein the present invention further comprises a road feel simulation mechanism which comprises:
    a steering wheel, of which a center is connected with a steering shaft through spline;
    a sensor module, mounted on the steering shaft and used for detecting a torque and a steering angle of the steering wheel; and
    a road feel simulation motor, of which a motor output shaft is connected with the steering shaft by virtue of a worm gear and worm reducing mechanism, wherein the road feel simulation motor outputs a road feel simulation torque.

3. The steer-by-wire and independent-drive integrated wheel-side electric drive device according to claim 2, wherein each of the first double-rotor motor and the second double-rotor motor comprises:
    a shell having an accommodating space therein, used for arranging an outer rotor and an inner rotor;
    permanent magnets, embedded on inside and outside surfaces of the outer rotor;
    a stator fixed on an inner surface of the shell;
    a stator excitation winding, fixed on the stator and, carrying current to generate a magnetic field;
    an armature winding, mounted on the inner rotor;
    an outer rotor output shaft, wherein one end is connected with the outer rotor and the other end is connected with the driving gear, for outputting a steering torque for driving a wheel to steer; and
    an inner rotor output shaft, wherein one end is connected with the inner rotor and the other end is connected with a first drive shaft or a second drive shaft, for outputting a driving torque for driving a vehicle to run.

4. The steer-by-wire and independent-drive integrated wheel-side electric drive device according to claim 3, wherein the outer rotor comprises a main body and an end cover matched with each other in a castellated manner; the inner rotor is nested in an accommodating space formed by the main body and the end cover through the support of a front bearing and a rear bearing, and an output end of the inner rotor penetrates out of the accommodating space and is connected with an inner rotor output shaft.

5. The steer-by-wire and independent-drive integrated wheel-side electric drive device according to claim 4, wherein the electric drive device further comprises:
    an idler shaft, respectively meshed with the driving gear and the driven gear, and used for transmitting power from the driving gear to the driven gear;
    a gear box body, of which an interior is hollow, for accommodating the driving gear, the idler shaft and the driven gear; and
    a gear box cover, connected with the gear box body by bolts, and used for covering an opening of the gear box body.

6. The steer-by-wire and independent-drive integrated wheel-side electric drive device according to claim 5, wherein the drive device further comprises:
    a steering gear sleeve, of which an interior is hollow, for accommodating a steering gear lead screw,
    wherein upper ring grooves for accommodating thrust bearings are formed in both ends of the driven gear, lower ring grooves are correspondingly formed in the steering gear sleeve, and the driven gear is supported on the steering gear sleeve by virtue of the thrust bearings,
    wherein a first spiral raceway and an inner circulation raceway are formed in inner hole walls of the driven gear, and a second spiral raceway which is in clearance fit with the first spiral raceway is formed in the steering gear lead screw; and
    a ball, rolling along the first spiral raceway, the second spiral raceway and the inner circulation raceway, and used for alleviating friction force.

7. The steer-by-wire and independent-drive integrated wheel-side electric drive device according to claim 6, wherein
    one end of each of the first drive shaft and the second drive shaft is connected with the inner rotor output shaft by virtue of an inner universal joint, for inputting drive power; and
    one end of an outer half-axle is respectively connected with the other end of each of the first drive shaft and the second drive shaft by virtue of an outer universal joint;
    a steering knuckle is supported on a hub and a wheel by virtue of a hub bearing, and a hollow journal is arranged on the steering knuckle;
    the other end of the outer half-axle penetrates through the hollow journal and is connected with the hub by virtue of a rim bolt, for driving the wheel to rotate; and
    the steering knuckle is connected with a tie rod by virtue of a steering knuckle arm ball stud, and is used for driving the wheel to steer.

8. The steer-by-wire and independent-drive integrated wheel-side electric drive device according to claim 1, wherein the drive device further comprises:
a driving and steering integrated controller connected with a controller of the first double-rotor motor and the second double-rotor motor by virtue of a CAN bus, wherein the controller of the double-rotor motors receives an instruction of the driving and steering integrated controller and controls the inner rotors to output driving torques and controls the outer rotors to output steering torques,
wherein the inner rotors of the first double-rotor motor and the second double-rotor motor output different driving torques, and a difference of the driving torques cooperatively drives the wheel to steer.

* * * * *